(12) United States Patent
Harrison (10) Patent No.: US 8,136,822 B2
(45) Date of Patent: Mar. 20, 2012

(54) HAND TRUCK LOADING ACCESSORIES (76) Inventor: Francis Anthony Harrison, Houston, TX (US)

( * ) Notice: Subject to any disclaimer, the term of this patent is extended or adjusted under 35 U.S.C. 154(b) by 195 days.

(21) Appl. No.: 12/405,156

(22) Filed: Mar. 16, 2009

(65) Prior Publication Data

US 2010/0230918 A1    Sep. 16, 2010

(51) Int. Cl.
*B62B 1/00* (2006.01)
*B62B 3/00* (2006.01)

(52) U.S. Cl. ............... 280/47.17; 280/47.27; 280/47.18; 280/47.371

(58) Field of Classification Search ............... 280/47.17, 280/47.27, 47.37, 47.28, 47.29; 419/490
See application file for complete search history.

(56) References Cited

U.S. PATENT DOCUMENTS

| | | | | | |
|---|---|---|---|---|---|
| 2,490,189 | A | * | 12/1949 | Alexander | 280/655 |
| 2,546,876 | A | * | 3/1951 | Sutherland | 280/47.27 |
| 3,035,727 | A | * | 5/1962 | Turner | 414/444 |
| 3,308,978 | A | * | 3/1967 | Smith, Jr. | 414/490 |
| 4,239,249 | A | * | 12/1980 | Sprague | 280/47.2 |
| 5,120,072 | A | * | 6/1992 | Laramie | 280/47.17 |
| 5,249,438 | A | * | 10/1993 | Rhaney et al. | 62/457.7 |
| 5,941,543 | A | * | 8/1999 | Kazmark, Jr. | 280/47.29 |
| 6,079,941 | A | * | 6/2000 | Lee | 414/812 |
| 6,237,925 | B1 | * | 5/2001 | Koenig | 280/47.29 |
| 7,140,635 | B2 | * | 11/2006 | Johnson et al. | 280/646 |
| 7,530,579 | B2 | * | 5/2009 | Butler | 280/47.28 |
| 2007/0295562 | A1 | * | 12/2007 | Burton et al. | 187/233 |

* cited by examiner

*Primary Examiner* — J. Allen Shriver, II
*Assistant Examiner* — James M Dolak
(74) *Attorney, Agent, or Firm* — Delphine James

(57) ABSTRACT

Accessories to provide extra lifting leverage to two wheel hand truck used to move heavy objects. One accessory is a pair of extension rails are removable attached to the frame structure. Another accessory is a secondary foot assembly removable attached to the lower end of the frame structure.

9 Claims, 6 Drawing Sheets

HAND TRUCK LOADING ACCESSORIES

BACKGROUND

The present invention relates to a two-wheel hand truck. More particularly, the present invention relates to accessories to support two wheel hand truck. Conventional hand trucks normally are L-shaped frame structure with handle at the top most portion of the frame structure, a small loading platform at the lower end of the frame structure to lift objects thereon, and wheels supporting the frame structure for ease of movement. In normal use, object(s) to be moved are tilted forward; the loading platform is inserted underneath them, and the object(s) is allowed to tilt back and rest on the platform. Then, the truck and object(s) are tilted backward until the weight is balanced over the large wheels, making otherwise bulky and heavy object(s) easier to move.

The moving industry as a whole is constantly seeking ways to make more efficient use of its labor force and reduce injuries that result in lost time at company expense. Historically, the industry has relied heavily on the two wheeled hand truck as the preferred equipment and as such has been utilized extensively in the industry. A multitude of problems exist with the currently available two wheeled hand trucks. Some of the problems include the inability to tilt and stabilize a load efficiently, inability of the operator to control the speed of the lift and descent of the load and the injuries sustained by operators lifting loads heavier than their personal ability. Accordingly there is a need for a new and improved leveraged two wheeled hand truck.

In the prior art, there are hand trucks adapted with accessories. For example, 4776,603 disclosed leverage assisting secondary assembly. However, the present invention provides a novel design accessory for two wheel handle trucks.

SUMMARY

Broadly stated, the present invention comprises a conventional hand truck having a frame structure including a pair of spaced apart, parallel frame members that define the upper and lower end of frame ends. A load platform is held relative to the frame structure adjacent one end thereof and wheels to facilitate movement is rotatably held relative to the frame structure adjacent the load platform, a handle fixed to and the frame intermediate the frame ends, a member extendable from the other end of the frame along the parallel frame members, and means for removable member to cooperate with the handle to limit the extension for the member from the other end of the frame and selectively hold the removable member in an extended position relative to the frame.

The present invention comprises accessories to the hand truck which includes a handle assembly and a foot pedal assembly. The handle assembly provides a two-wheel tilt type hand truck comprising a top end handle assembly attachment for increasing the effective height of the frame structure to hold steady extremely tall loads thereof;

The other accessory includes a foot pedal assembly having a bottom frontal ground engaging member and a rear bottom end foot support for engaging with the hand truck frame structure to supply additional leverage for elevating the load and tilting it backward to facilitate movement thereof. The novelty and advantages of the new and improved leveraged two wheeled hand truck include the ability to overcome the referenced problems with the assistance of added leverage against the load therefore reducing the amount of physical exertion required to lift and control the loaded equipment.

Other novelty and advantages of the present invention will become apparent in the detailed description and drawings.

It is one object of this invention to overcome the above problems by providing a hand truck having a load-carrying removable member and being extremely simple in design and smooth in operation. It is a further object of the invention to provide a hand truck having an removable member which may be applied to increase height in the simplest manner, the hand requiring no complicated device for holding the extending member in its extended position.

DESCRIPTION OF THE PREFERRED EMBODIMENT

Figure 1:
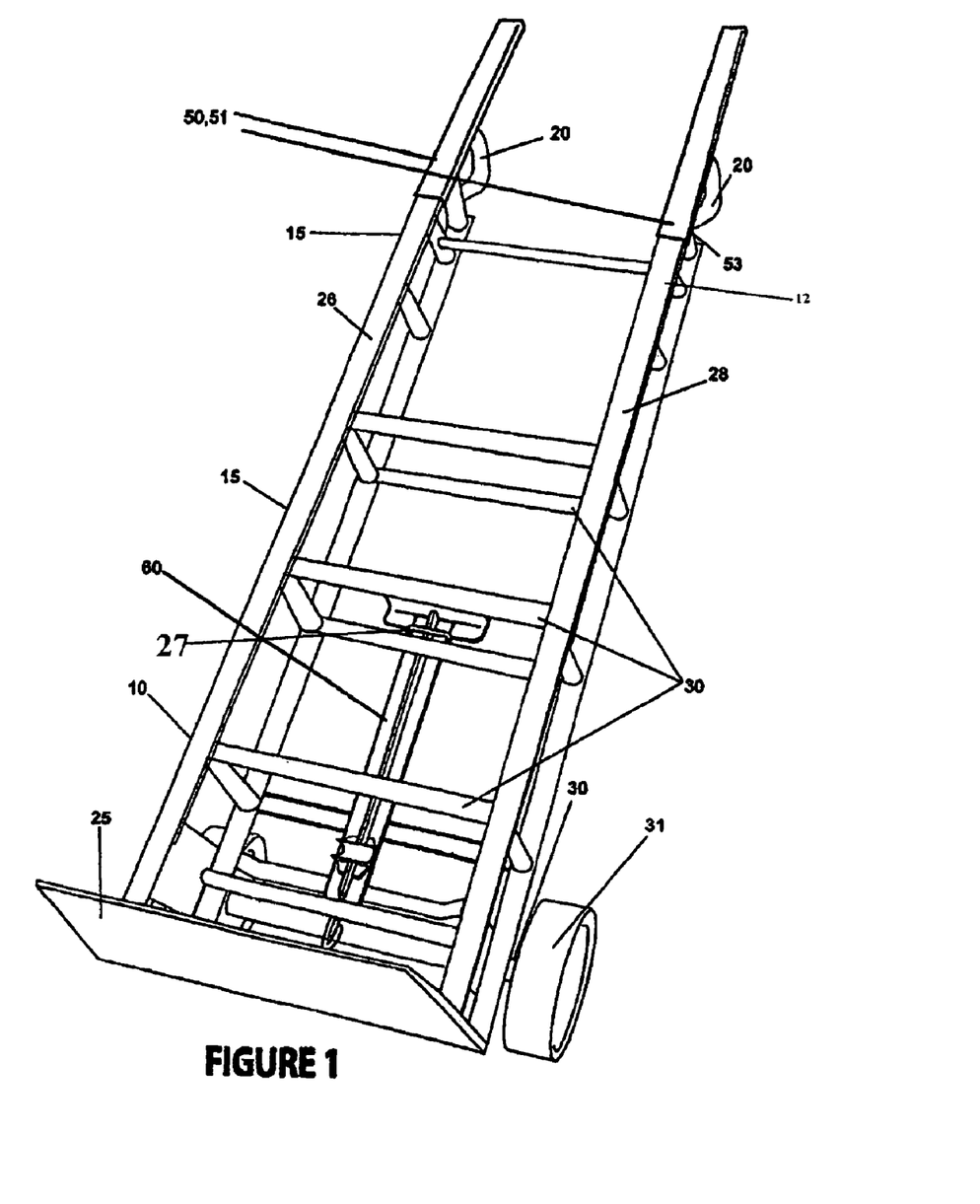
FIG. 1 is a perspective view of an hand truck with the accessories engaged in a storage position.

With reference now to the drawings and in particular to FIG. 1 a new and improved leveraged two wheel hand truck embodying the principles and concepts of the present invention and generally designated by the reference numeral 50, 60 will be described below. Further referencing FIG. 1 the drawings there is shown the preferred embodiment of the present invention, extension rail assembly 50 and foot pedal assembly 60 in a storage position upon a conventional hand truck.

More specifically, it will be noted that the hand truck comprises a conventional frame structure 12 with a topmost portion of the frame having an integral angulated primary handle (20). Attached to a bottommost portion of the frame in a conventional manner is a lifting and load plate (25), while a conventional axle and wheel assembly (30) is also illustrated for facilitating movement thereon. Frame structure (12) consists of a pair of spaced apart vertically extending rod members (26, 28) in parallel relation rigidly attached to a pair of horizontal braces. The frame structure shown 12 is one sample illustration. The frame structure 15 described above is the currently existing design and such structure forms a basis for the invention to combine therewith.

It is to be noted that the hand truck 10 comprises a conventional frame structure 15 with the topmost portion of the frame structure 15 having an integral angular shape primary handle 20. Attached to the bottom most portion of the frame structure 15 is a conventional loading plate 25.

Conventional axle and wheel assembly 30 supports the frame structure 15. Further referencing FIG. 1 of the drawings, it will be observed that the present invention comprises a pair of secondary handle assembly 50 operationally attached to the frame structure 12 in a manner yet described.

Figures 5, 5A:
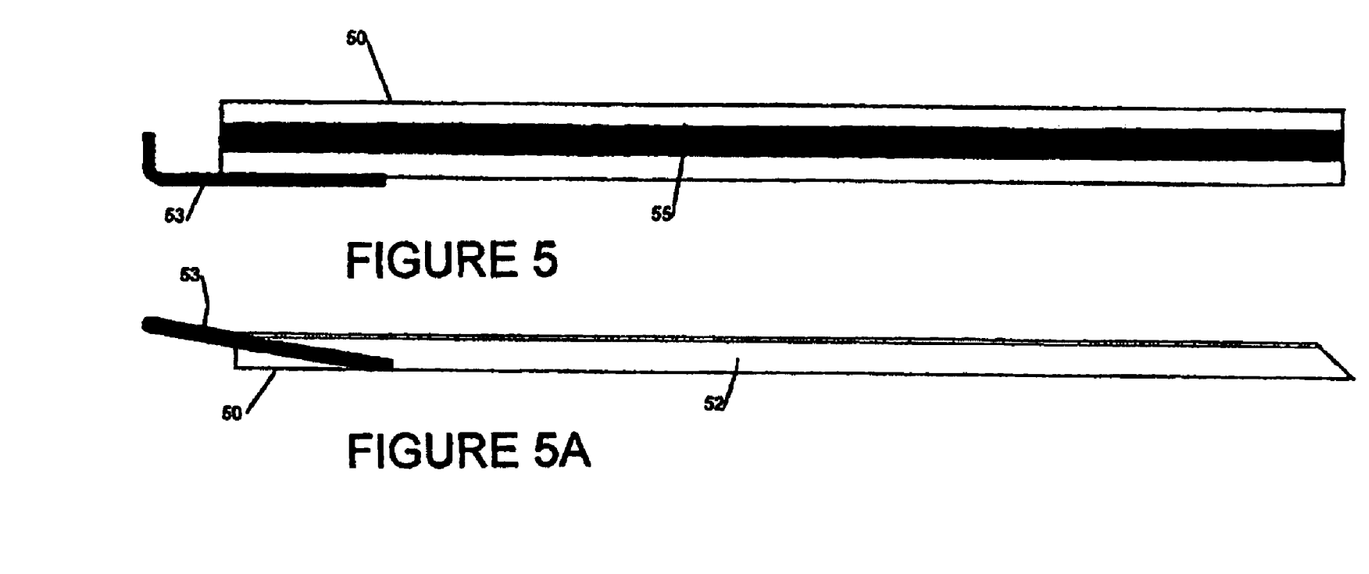
FIG. 5 is a top view of the extension rail.
FIG. 5A is a side view of the extension rail.
Figure 5B:
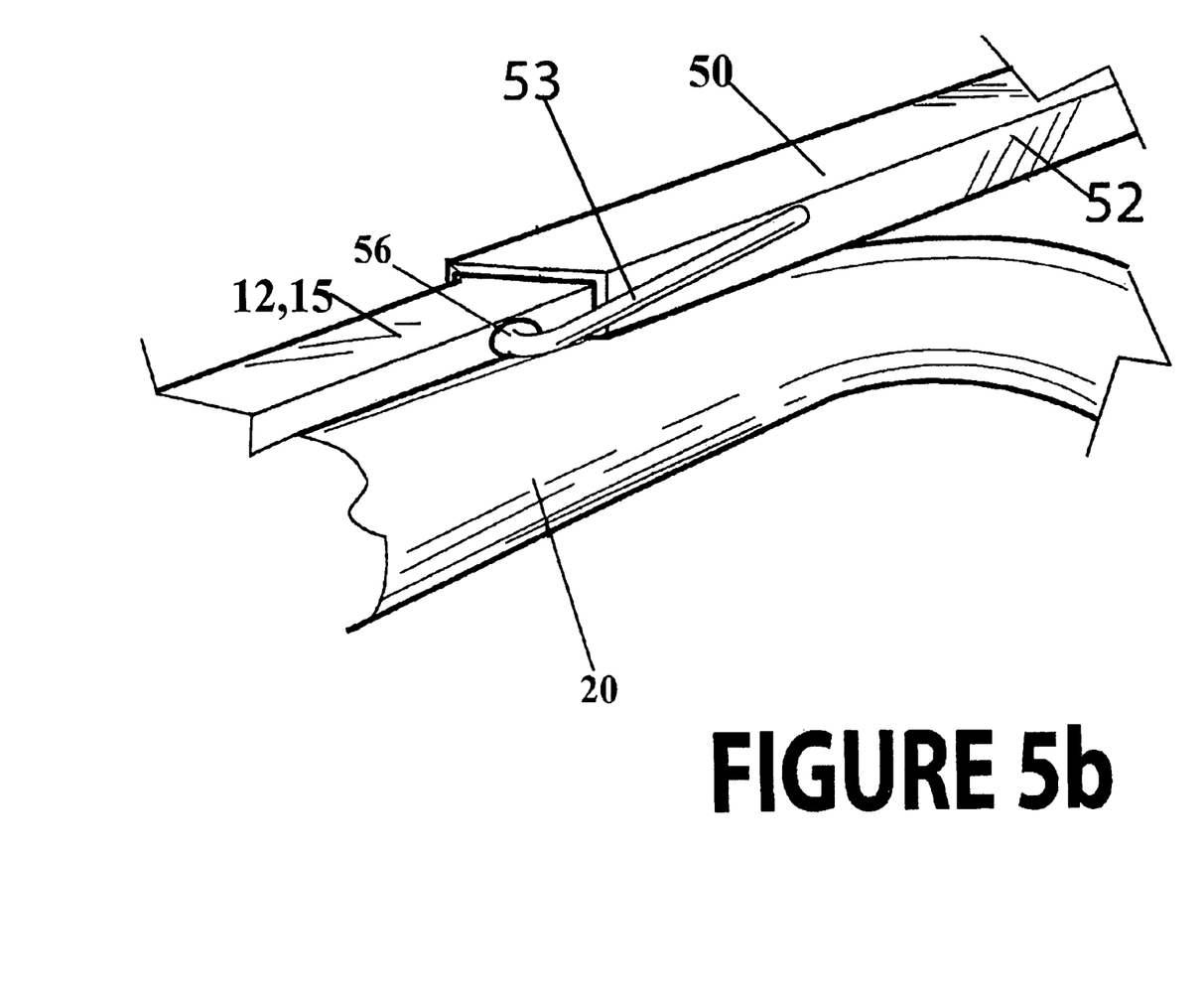
FIG. 5B a cutaway view of the extension rail in place on the dolly.

As depicted in FIG. 5, each extension rail of assembly (50, 51) comprises an elongated bar 52 with a recessed portion 54 incorporated within the underside of the elongated bar 52. As depicted in FIG. 1, the recessed portion 54 is adapted to slide upon the upper portion of the pair of vertical parallel rod members (26, 28). In the illustrated embodiment each extension rail assembly (50, 51) further comprises a pair of non-connected bars that are welded together of the same size, shape, and length. As shown 55 can provide a gripping member or non-skidding member that extends length wise across (50, 51). can Each bar 52 has with a recessed portion 54 incorporated within its underside portion 54. In use, underside portion 54 of each bar 52 is adapted to slidably engage upon the topmost portion of each parallel rod (26, 28). Extension rail assembly (50, 51) provides the operator the capability of supporting the lifting of a heavy long structure. Extension rail assembly (50, 51) is inserted into onto the upper portion of parallel rod members (26, 28) to increase height to hold steady extremely tall loads thereof.

Referring to FIGS. 5 and 5A, the present invention further comprises a means for securing the extension rail (50, 51) upon the pair of rod members 26, 28. As shown in FIG. 1, an aperture 56 is incorporated on the side of each rod member (26, 28) and extends therein. A mating hook 53 is attached to each bar 52 of the extension rail (50, 51) along the outer surface near the distal end in a diagonal configuration. The top end of hook 53 extends outwardly past the edge of bar 52 and extends at a right angle towards the interior of the elongated bar In operational use, hook 53 is inserted into an aperture 58 incorporated into each rod member (26, 28), thereby securing in place the extension rail assembly.

Additionally, the conventional frame structure 15 further comprises a pair of parallel vertically spaced apart rods (26, 28) integrally connected with the topmost and bottom most portion of the frame structure 15. Disposed between the pair of parallel spaced rods (26, 28) from the top most portion to the distal end of the bottom most portion are a plurality of horizontal cross bars 30.

Figures 3, 3A, 3B:
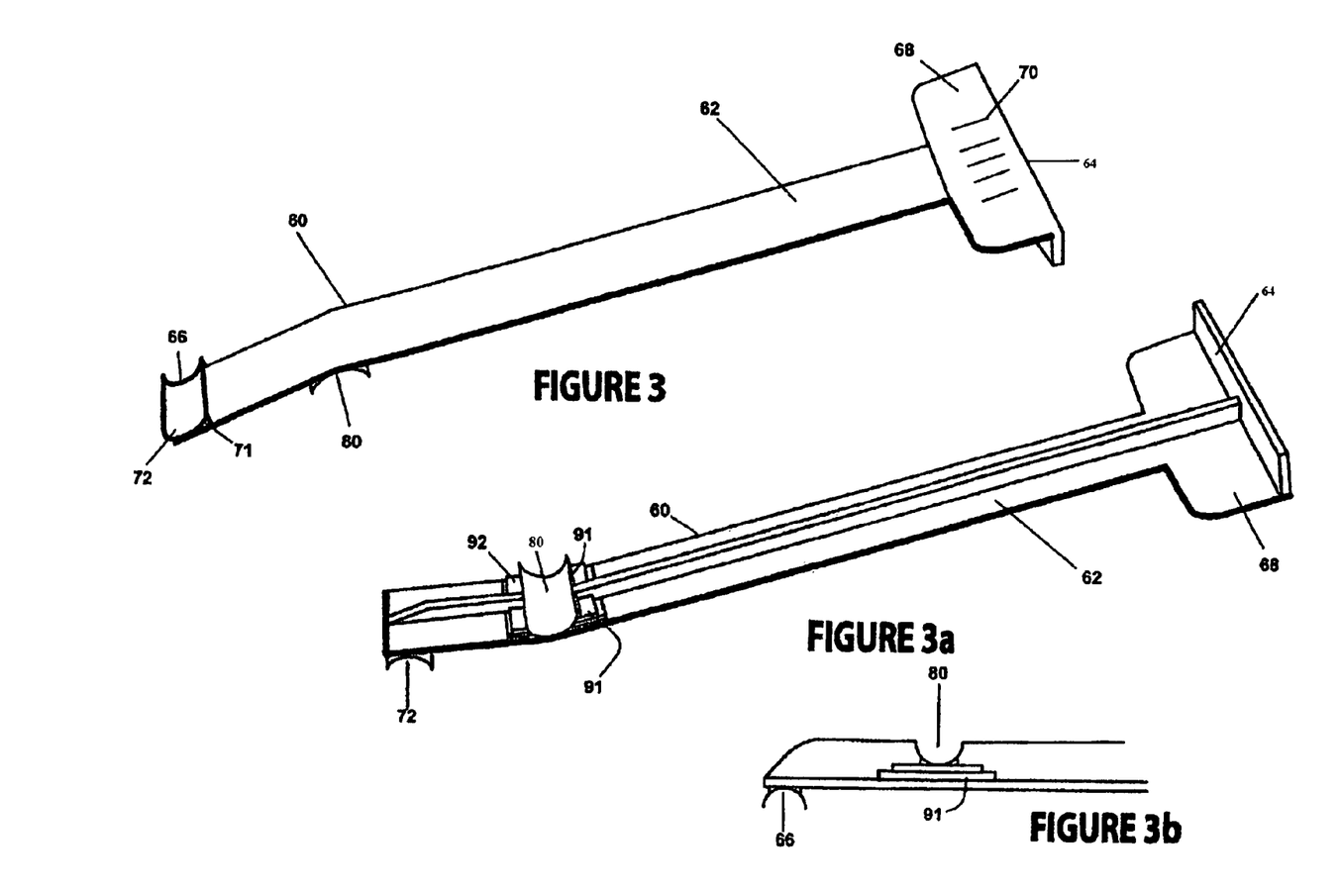
FIG. 3 is an exploded top side exploded view of the foot pedal assembly.
FIG. 3A is an exploded bottom side view of the foot pedal assembly.
FIG. 3B is an exploded bottom view of the connector member of foot pedal assembly.
Figure 4:
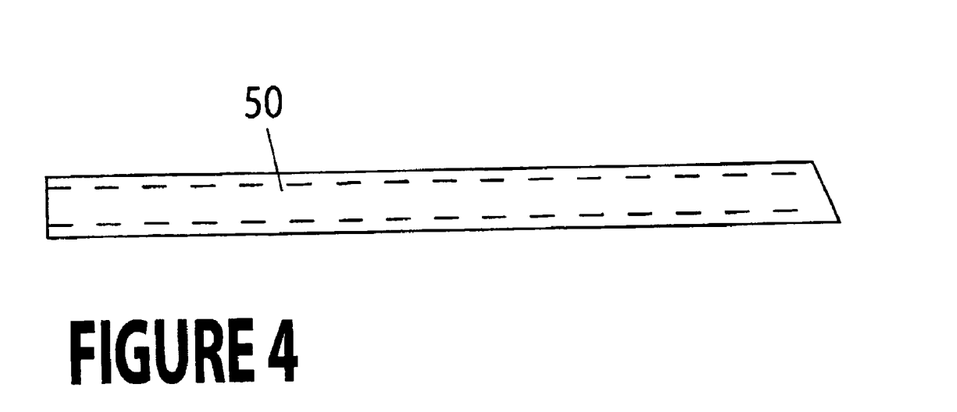
FIG. 4 is a cross sectional view of the extension rail.
Figure 4A:
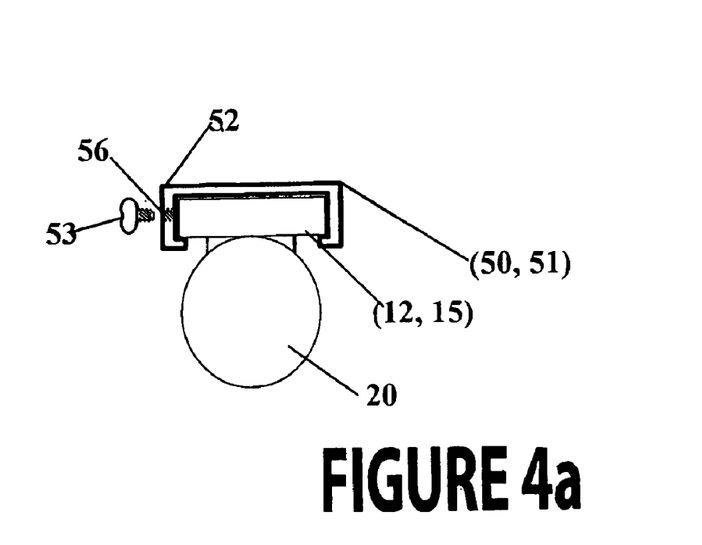
FIG. 4A is a frontal cross-sectional view of the extension rail in place on the dolly.

As shown in FIGS. 3 and 3A, foot pedal assembly 60 further comprises a shaft member 62 with a foot support 64 attached at the topmost portion of the shaft 62. Attached to the lower most portion of the shaft member 62 is an assembly connector member 66. In the preferred embodiment, foot support 64 has a semi-circular flat platform 68 structure integrally attached to the topmost portion of shaft member 62. In some configurations, the topside of the semicircular platform structure 68 further includes a plurality of ridges 70 incorporated thereon to provide gripping means during use. Foot pedal assembly 60 consisting of a top end that is removable attached to the horizontal braces and a bottom end to engage foot and add leverage.

Figure 2:
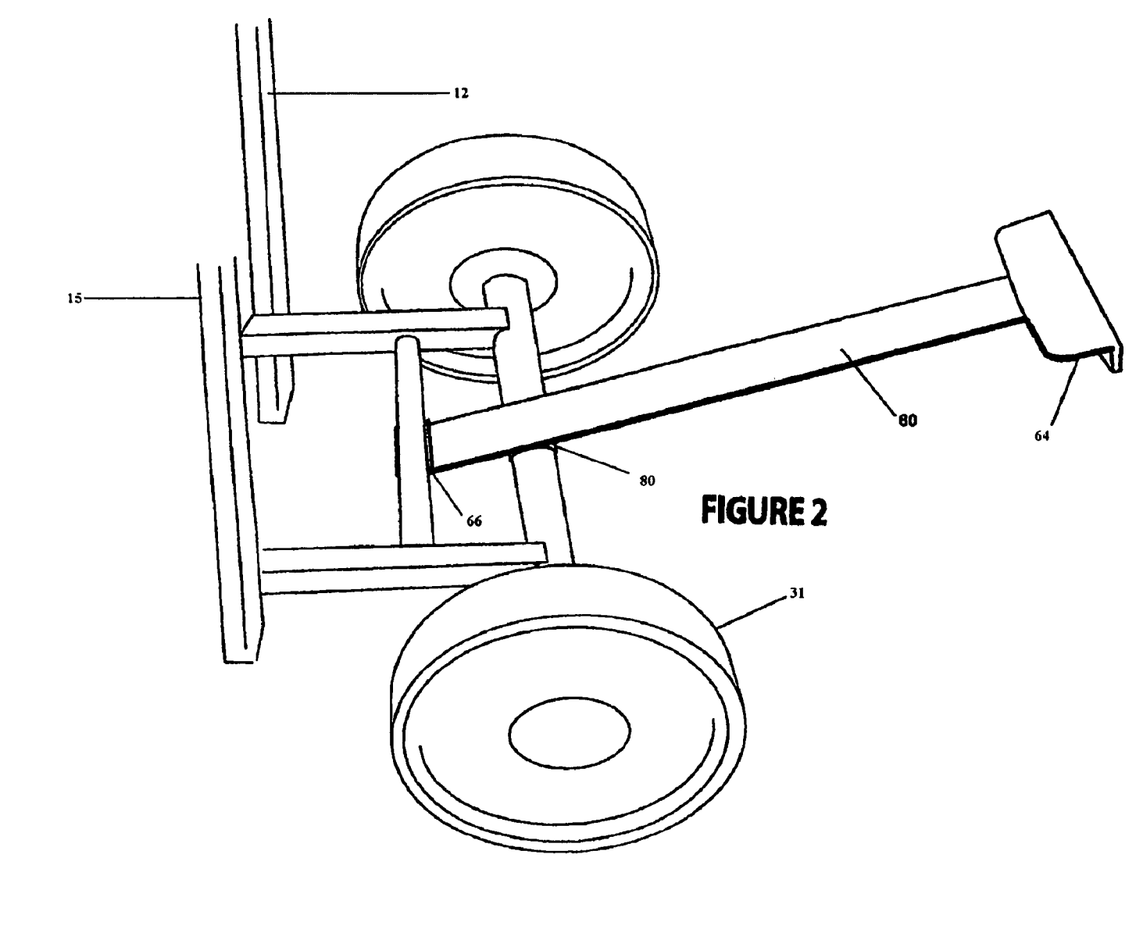
FIG. 2 is a frontal view of the leveraged two wheel hand truck with the foot pedal assembly engaged thereupon.

Top connector member 66 further includes a bar member 71 with a U-shaped recessed portion 72 incorporated within the underside portion therein and integrally attached to the lower most portion of the shaft member 62. As shown in FIG. 2, top connector member 66 is adapted to removably engage in the an obtuse angular configuration with the crossbars located at the distal end of the frame structure and protrude outwardly and rearwardly therefrom Near the distal end of the underside portion of shaft member 62 is bottom connector member 80 which includes a raised base member 91 with a U-shaped recessed portion 72 incorporated within the underside portion therein and integrally attached to the distal end of the underside of the shaft member 62.

The mid point of the bottom connector member defines the pivot point of the shaft member 62. The pivot point divides shaft member 62 into an upper section and a lower section. The shaft member 62 has to be structured at that pivot point to allow the shaft member 62 to be operationally attached to the frame structure to provide the greatest amount of leverage during operation by the user. In the preferred embodiment, the lower section of shaft member 62 inclines downward at approximately a 10 degree angle to provide the greatest amount of leverage. As shown FIG. 3B, to stabilize the shaft member 62, the bottom support member is reinforced with a plurality of stacked durable plates (91, 92) which surround the pivot point. In the preferred embodiment the durable plates (91, 92) are made of steel or another suitable member that can withstand the operational requirements of the heavy load.

Referring to FIG. 2, there is shown secondary foot pedal assembly 60 attached in an operational configuration. As depicted, the top connector member ( ) is removable attached to the horizontal brace (34) at the bottom right above the wheel axle and the bottom connector member ( ) is removably attached to the wheel axle (32) wherein a secure connection is formed to support the lifting of heavy load. Foot pedal assembly (60) extends outwardly and rearwardly in an obtuse angular configuration. While not in use, utilizing device connector member ( ), foot pedal assembly is removably attached to the frame structure 12 between the pair of parallel rods in a parallel relation therewith as shown in FIG. 1. Foot pedal assembly is removable and stored for easy access when needed. Referring to FIG. 2 there is shown one embodiment of the with the foot pedal assembly (60) in place upon a conventional drop down wheel assembly on one type of hand truck supported by a pair of wheels (31). As further depicted extra rod member (34) is coupled in a parallel arrangement in front of axel (32) between support members (36) and (37).

The advantage of the present invention is readily apparent to one skilled in the art and can be demonstrated with a simple example as described below. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In a test of the preferred embodiment, a test load of 519 lbs was loaded on a standard two wheeled hand truck, a 180 lb operator stood on the pivotal axle of the equipment and 112 lbs of pull was required to lift the load to the point of equilibrium (the point where the load is balanced over the axle). Subsequently the same 519 lb test load was loaded on the same equipment with the current invention added. With the 180 lb operator repositioned so that his weight is on the foot support it only required 64 lbs of pull to lift the load to the point of equilibrium. In the second test of the preferred embodiment, exemplifying the more accepted method of use in the industry for lifting heavy loads, a test load of 519 lbs was loaded on a standard two wheeled hand truck, a 180 lb primary operator stood on the pivotal axle of the equipment and a second operator standing behind the primary operator was required to exert 72 lbs of pull on the combined loaded equipment and primary operator to lift the load to the point of equilibrium. Subsequently the same 519 lb test load was loaded on the same equipment with the current invention added. With the 180 lb operator repositioned so that his weight is on the foot support and it only required 48 lbs of pull from the secondary operator to lift the load to the point of equilibrium. Thus, in use the foot pedal assembly provides the operator at least an increase leverage 30 percent of pounds of pressure.

What is claimed is:

1. A wheeled hand truck in combination with accessories for increasing the lifting load, the hand truck comprising:
   a frame structure having a primary handle integrally attached to a topmost portion;
   an extension handle assembly removably attached to the primary handle and adapted to extend the length of the primary handle;
   a load plate frontally attached to the lower most portion of the frame structure; the frame structure supported by a wheel means connected to an axle for facilitating movement;
   a pair of vertical rods extending from the topmost portion to the lower most portion with a plurality of cross bars disposed therebetween;
   a foot pedal assembly having a shaft member with a foot support attached at a topmost portion of the shaft member;
   a top assembly connector member being attached to an opposing lower most portion of the shaft member;
   an extra rod attached directly in front of the axle in a parallel arrangement and securely coupled thereto;
   while in operational use, the top assembly connector member having an integral upper coupling mechanism which removably engages in an obtuse angular configuration with the extra rod wherein the shaft member is removably engaged therewith; and protrudes outwardly therefrom wherein a greater amount of leverage is provided to an operator;
   a bottom assembly connector member situated at an underside portion of a distal end of the shaft member a predetermined distance above the top assembly connector member, the bottom assembly connector member having a bottom coupling mechanism that provides a means for removably connecting the shaft member to the axle;
   the bottom coupling mechanism being located near the distal end wherein the shaft member is secured between the axle and the extra rod.

2. The hand truck of claim 1 wherein the foot support of the foot pedal assembly is a semi-circular flat platform structure integrally attached to the topmost portion of the shaft member.

3. The hand truck of claim 2 wherein the semi-circular platform structure further includes a top side with a plurality of ridges incorporated thereon to prevent slippage of an operator foot during operational use.

4. The hand truck of claim 1 wherein the bottom assembly connector member further includes a bar member with a U-shaped recessed portion incorporated within the underside portion therein and integrally attached to the lower most portion of the shaft member.

5. The hand truck of claim 1 wherein the extension rail assembly further comprises:
   a pair of non-connected elongated bar members of the same size, length and shape;
   each bar member having an underside portion with a recessed portion incorporated therein;
   the recessed portion of the pair of elongated bar members being adapted to be removable engaged upon the topmost portion of the pair of vertical support rods wherein the length of the pair of vertical rods are extended to support large extended loads.

6. The hand truck of claim 1 wherein while in non-operational use, the foot pedal assembly being adapted to be disposed in a parallel relation between the pair of vertical rod support members.

7. The hand truck of claim 1 wherein the bottom connector further comprises
   a pivot point centrally located within the bottom connector dividing the shaft member into an upper section and lower section; and
   the lower section of the assembly member inclining at least ten degrees to allow for the maximum height of distance from the ground level.

8. A kit for a wheeled hand truck in combination with accessories for increasing the lifting load, the kit comprising:
   a frame structure having a primary handle integrally attached to a topmost portion;
   an extension handle assembly removably attached to the primary handle and adapted to extend the length of the primary handle;
   a load plate frontally attached to the lower most portion of the frame structure;
   the frame structure supported by a wheel means connected to an axle for facilitating movement;
   a pair of vertical rods extending from the topmost portion to the lower most portion with a plurality of cross bars disposed therebetween;
   an extra rod attached directly in front of the axle in a parallel arrangement and securely coupled thereto;
   a foot pedal assembly having a shaft member with a foot support attached at a topmost portion of the shaft member;
   a top assembly connector member being attached to an opposing lower most portion of the shaft member;
   while in operational use the top assembly connector member having an integral upper coupling mechanism which removably engages in an obtuse angular configuration with the extra rod, wherein the shaft member is removably engaged therewith, and protrudes outwardly therefrom wherein a greater amount of leverage is provided to an operator;
   a bottom assembly connector member situated at an underside portion of a distal end of the shaft member a predetermined distance above the top assembly connector member, the bottom assembly connector member having a bottom coupling mechanism that provides a means for removably connecting the shaft member to the axle;
   the bottom coupling mechanism being located near the distal end wherein the shaft member is secured between the axle and the extra rod.

9. A method for using a hand truck for supporting a heavy load, the method comprising:
   providing a hand truck with a frame structure having a primary handle integrally attached to a topmost portion and a load plate frontally attached to the lower most portion of the frame structure, the frame structure supported by a wheel means connected to an axle for facilitating movement, a pair of vertical rods extending from the topmost portion to the lower most portion with a plurality of cross bars disposed therebetween;
   providing an extension handle assembly removably attached to the primary handle and adapted to extend the length of the primary handle;
   securely attaching an extra rod attached directly in front of the axle in a parallel arrangement and securely coupled thereto;
   providing a foot pedal assembly having a shaft member with a foot support attached at a topmost portion of the shaft member;
   attaching a top assembly connector member to an opposing lower most portion of the shaft member;

while in operational use, the top assembly connector member having an integral upper coupling mechanism which removably engages in an obtuse angular configuration with the extra rod, wherein the shaft member is removably engaged therewith, and protrudes outwardly therefrom wherein a greater amount of leverage is provided to an operator;

providing a bottom assembly connector member situated at an underside portion of a distal end of the shaft member a predetermined distance above the top assembly connector member, removably connecting the bottom assembly connector member using a bottom coupling mechanism to the shaft member of the axle;

securing the shaft member between the axle and the extra rod.

\* \* \* \* \*